(12) United States Patent
Kaneko et al.

(10) Patent No.: US 9,247,722 B2
(45) Date of Patent: Feb. 2, 2016

(54) FISHING REEL

(71) Applicant: GLOBERIDE. INC, Higashikurume-shi (JP)

(72) Inventors: Kyoichi Kaneko, Higashikurume (JP); Wataru Tsutsumi, Higashikurume (JP); Yuuichi Umezawa, Higashikurume (JP)

(73) Assignee: GLOBERIDE, INC., Higashikurume-shi (JP)

( * ) Notice: Subject to any disclaimer, the term of this patent is extended or adjusted under 35 U.S.C. 154(b) by 16 days.

(21) Appl. No.: 14/196,866

(22) Filed: Mar. 4, 2014

(65) Prior Publication Data

US 2014/0183292 A1 Jul. 3, 2014

Related U.S. Application Data

(63) Continuation of application No. PCT/JP2013/064638, filed on May 27, 2013.

(30) Foreign Application Priority Data

May 29, 2012 (JP) .................................. 2012-121952
Jun. 19, 2012 (JP) .................................. 2012-137999

(51) Int. Cl.
*A01K 89/01* (2006.01)
*A01K 89/015* (2006.01)

(52) U.S. Cl.
CPC ........... *A01K 89/0108* (2013.01); *A01K 89/015* (2013.01)

(58) Field of Classification Search
CPC ................ A01K 89/019125; A01K 89/01915; A01K 89/015

USPC .......................................... 242/273, 274, 277
See application file for complete search history.

(56) References Cited

U.S. PATENT DOCUMENTS 3,111,287 A * 11/1963 Baenziger ..................... 242/280
3,171,609 A  3/1965 Baenziger
(Continued)

FOREIGN PATENT DOCUMENTS

CN  1248399 A  3/2000
CN  102428901 A  5/2012
(Continued)

OTHER PUBLICATIONS

International Search Report mailed Aug. 20, 2013 for PCT/JP2013/064638 filed on May 27, 2013 (English).
(Continued)

*Primary Examiner* — Emmanuel M Marcelo
(74) *Attorney, Agent, or Firm* — Oblon, McClelland, Maier & Neustadt, L.L.P.

(57) ABSTRACT

The fishing reel includes a spool 5A rotatably supported between side plates of a reel body 2, and a level wind device 50 with a fishing line guide body 60 configured to thread a fishing line unreeled from the spool 5A and reciprocate between the right and left side plates. The fishing line guide body 60 is supported in front of the spool and switchable between fishing line winding/unwinding states, and includes a fishing line guide section 67 for guiding the fishing line to the spool in the winding state and having a narrow width in the right and left direction, an opening 68 to reduce resistance against unwinding line in the unwinding state and having a wide width in the right and left direction, and a regulator 69 configured to prevent the fishing line from slipping out of the fishing line guide section in the winding state.

12 Claims, 12 Drawing Sheets

(56) References Cited

U.S. PATENT DOCUMENTS

| | | | | |
|---|---|---|---|---|
| 4,747,560 | A * | 5/1988 | Karlsson | 242/260 |
| 5,833,155 | A * | 11/1998 | Murayama | 242/279 |
| 5,996,919 | A * | 12/1999 | Murayama et al. | 242/279 |
| 6,053,444 | A | 4/2000 | Yamaguchi et al. | |
| 6,247,663 | B1 | 6/2001 | Matsuda | |
| 6,409,113 | B1 * | 6/2002 | Hirayama et al. | 242/310 |
| 8,714,470 | B2 | 5/2014 | Toma | |
| 2004/0144877 | A1 * | 7/2004 | Kawasaki | 242/278 |
| 2006/0237565 | A1 * | 10/2006 | Barker | 242/229 |
| 2009/0250541 | A1 * | 10/2009 | Tsutsumi | 242/257 |
| 2012/0104135 | A1 * | 5/2012 | Toma | 242/227 |

FOREIGN PATENT DOCUMENTS

| | | |
|---|---|---|
| EP | 0 865 730 A2 | 9/1998 |
| JP | 39-011030 B | 6/1964 |
| JP | 58-068878 U | 5/1983 |
| JP | 11-089487 A | 4/1999 |
| JP | 2009-284777 A | 12/2009 |
| JP | 2012-070683 A | 4/2012 |
| JP | 2012-070684 A | 4/2012 |
| JP | 2012-095560 A | 5/2012 |

OTHER PUBLICATIONS

Combined Chinese Office Action and Search Report issued Nov. 17, 2014 in Patent Application No. 201380003251.9 (with English language translation and English translation of categories of cited documents).

Partial Supplementary European Search Report issued May 21, 2015 in Patent Application No. 13796463.1.

Extended European Search Report issued Sep. 15, 2015 in Patent Application No. 13796463.1.

* cited by examiner

FISHING REEL

TECHNICAL FIELD

The present invention relates to a fishing reel including a fishing line guide body which is provided between side plates in front of a spool to guide and wind a fishing line onto the spool in parallel.

BACKGROUND ART

In the related art, there is a double-bearing fishing reel in which a level wind device is mounted such that a fishing line can be uniformly wound around a spool rotatably supported between right and left side plates. This level wind device includes a fishing line guide body that reciprocates in the right and left direction in front of the spool in conjunction with winding operation of a handle rotatably mounted on one of the side plates, and the fishing line can be wound onto the spool in parallel by threading the fishing line through the fishing line guide.

Incidentally, the above-mentioned fishing line guide body has a problem, for example, in which a flying distance of a terminal tackle may be shortened when the terminal tackle is cast because of resistance caused by contacting the fishing line. To solve the above problem, Patent Literature 1 discloses, for example, a configuration in which an upper portion of the fishing line guide body is formed in a rectangular shape extending in the right and left direction and functions as a fishing line unwinding section at the time of unwinding the fishing line, and a lower portion of the fishing line guide body includes a narrow groove in the middle for guiding the fishing line, functioning as a fishing line guide section at the time of winding the fishing line. Further, on the rear side of the fishing line guide body, a pillar movable in the vertical direction in conjunction with switching operation of a clutch is provided. In the fishing line unwinding state, the pillar is moved upwardly so as to position the fishing line at the fishing line unwinding section to reduce the resistance of the fishing line, and in the fishing line winding state, the pillar is moved downwardly such that the fishing line is guided through the narrow groove to improve spooled condition of the fishing line.

CITATION LIST

Patent Literature

Patent Literature 1: JP 2012-70683 A

SUMMARY OF INVENTION

Technical Problem

However, the fishing reel disclosed in Patent Literature 1 above is configured to control the fishing line path by vertically moving the pillar provided between the right and left side plates. Therefore, the structure is likely to be intricate and the cost is increased because the pillar needs to be mounted. Additionally, since the pillar is mounted on the rear side of the fishing line guide body, the size of the reel body tends to be enlarged in the front and rear direction.

Further, in the case of unwinding the fishing line with drag force set strong, a position of unwinding the fishing line spooled around the spool and a position of the fishing line guide body may be largely deviated in the right and left direction. Normally, the fishing line guide body is configured not to move in the right and left direction while unwinding the fishing line in order to reduce resistance against the spool rotation. Therefore, the fishing line guide body sometimes stops at one end portion of the right or left side due to repetitions of winding/casting, and simultaneously the fishing line being unwound from the spool is positioned at the other end portion (i.e., the positions of the fishing line guide body and the fishing line wound around the spool are deviated in the right and left direction). In the case where the fishing line is unwound with a high load while such a positional error is occurring, the fishing line is unwound, rubbing an inner surface of the fishing line guide body (i.e., inner surface of the narrow groove). In other words, the fishing line may move upward while being guided by the inner surface of the narrow groove, and sometimes may slip out of the narrow groove, pushing up the pillar. Further, in the case of winding the fishing line in such a state in which the fishing line has slipped out of the guide groove (but still positioned within the rectangular-shaped fishing line threading section), the condition of the fishing line at the beginning of winding becomes unstable, and the fishing line may be wound partly uneven (being overlapped partly) around the spool. Consequently, the spooled condition is deteriorated.

As a result, when the fishing line is unwound next time, there is a problem in which a flying distance is reduced because resistance against unwinding is caused by the unevenly wound part. Moreover, as described above, the fishing line which tries to move upward and slip out of the narrow groove may be bent because of the strong pressure applied by the pillar. Consequently, the fishing line may have more damage, thereby reducing its life, and further the fishing line guide body in the vicinity of the pillar may be damaged, too.

The present invention is achieved in view of the above-described problems, and the object of the present invention is to provide a fishing reel including a fishing line guide body having a simple structure and capable of reducing resistance against unwinding the fishing line, and further reducing the size of the reel body in the front and rear direction. Further, another object of the present invention is to provide the fishing reel including a fishing line guide body capable of providing a stable winding of the fishing line and reducing damage to the fishing line.

Solution to Problem

To achieve the above objects, the fishing reel according to the present invention includes a spool rotatably supported between right and left side plates of a reel body, and a level wind device including a fishing line guide body configured to thread a fishing line unreeled out from the spool and reciprocate between the right and left side plates. The fishing line guide body supported in front of the spool is switchable between a fishing line winding state and a fishing line unwinding state. Further, the fishing line guide body includes a fishing line guide section configured to guide the fishing line to the spool in the fishing line winding state and having a narrow width in a right and left direction, a fishing line unwinding section configured to reduce resistance against unwinding the fishing line in the fishing line unwinding state and having a wide width in the right and left direction, and a regulator configured to prevent the fishing line from slipping out of the fishing line guide section in the fishing line winding state.

According to the fishing reel having the above-described configuration, the fishing line guide body constituting the level wind device includes the fishing line guide section having the narrow width in the right and left direction, the fishing line unwinding section having the wide width in the right and left direction, and the regulator configured to prevent the fishing line from slipping out of the fishing line guide section in the fishing line winding state. The fishing line guide body is switchable between the fishing line winding state and the fishing line unwinding state in front of the spool, and in the case where the fishing line guide body is switched to the fishing line winding state, the fishing line is guided to the narrow fishing line guide section and wound uniformly around the spool by the guidance of the fishing line guide section without slipping out of the fishing line guide section by the control of the regulator. Further, in the case where the fishing line guide body is switched to the fishing line unwinding state, the control by the regulator is released and the fishing line is moved to the wide fishing line unwinding section. Thus, the resistance against unwinding the fishing line is reduced at the time of unwinding the fishing line. In other words, the fishing line guide body is configured to be switchable between the fishing line winding state and the fishing line unwinding state in front of the spool, and the fishing line guide section includes the narrow fishing line guide section, the wide fishing line unwinding section, and the regulator configured to prevent the fishing line from coming off the fishing line guide section in the fishing line winding state. With this configuration, the structure can be simplified and the number of components can be reduced because, unlike the related art, it is not necessary to control the fishing line path by providing the pillar moving vertically between the right and left side plates. Moreover, the size of the reel body can be reduced in the front and rear direction because it is not necessary to dispose the pillar on the rear side of the fishing line guide body. Additionally, since the fishing line path is controlled only by the form of the fishing line guide body, the form of the fishing line unwinding section may be easily enlarged and, as a result, the resistance against unwinding the fishing line may be more reduced.

Incidentally, in the above-described configuration, the fishing line guide body may be formed preferably in such a manner that the position of the fishing line guide body with respect to the fishing line changes when switching between the fishing line winding state and the fishing line unwinding state. In the fishing line unwinding state, the fishing line is positioned at the wide fishing line unwinding section, and in the fishing line winding state, the fishing line is positioned at the narrow fishing line guide section by the control of the regulator. Therefore, the fishing line guide body may be switched between both states by being rotated or by being moved linearly.

Additionally, to achieve the above-mentioned objects, a fishing reel according to the present invention includes a spool rotatably supported between the right and left side plates of the reel body; and a level wind device including a fishing line guide body configured to thread a fishing line unreeled from the spool and reciprocate between the right and left side plates, wherein the fishing line guide body includes a fishing line guide section configured to guide the fishing line to the spool in a fishing line winding state and having a narrow width in a right and left direction, a fishing line unwinding section configured to reduce resistance against unwinding the fishing line in a fishing line unwinding state and having a wide width in the right and left direction, and a line slippage preventing regulator configured to regulate the fishing line not to slip out of the narrow fishing line guide section to the wide fishing line unwinding section when the fishing line is unreeled.

According to the fishing reel having the above configuration, even though a position of unwinding the fishing line wound around the spool and a position of the fishing line guide body are largely deviated in the right and left direction when the fishing line is unwound with highly set drag force, the fishing line is prevented from moving to (slipping out to) a wide fishing line threading section from the narrow fishing line guide section (groove section) of the fishing line guide body by means of the line slippage preventing regulator. In other words, since the fishing line is prevented from moving to the wide fishing line unwinding section even though being unwound with high load, the fishing line is to be wound around the spool through the narrow fishing line guide section at the time of winding the fishing line. Accordingly, the fishing line may not be wound unevenly at the beginning of winding. Also, since the fishing line is prevented from slipping out to the wide fishing line unwinding section, the fishing line is not strongly pressed by the pillar or the like, and therefore damage is given to neither the fishing line nor the fishing line guide body.

Advantageous Effects of Invention

According to the present invention, it is possible to provide a fishing reel including the fishing line guide body having a simple structure, capable of reducing the resistance against unwinding the fishing line and capable of reducing the size of the reel body in the front and rear direction. Further, according to the present invention, the fishing line is prevented from slipping out of the narrow groove (fishing line guide section) when the fishing line is unwound. Therefore, spooling the fishing line is stabilized, and damage to the fishing line can be reduced.

DESCRIPTION OF EMBODIMENTS

A fishing reel according to the present invention will be described below with reference to the drawings.

Figure 1:
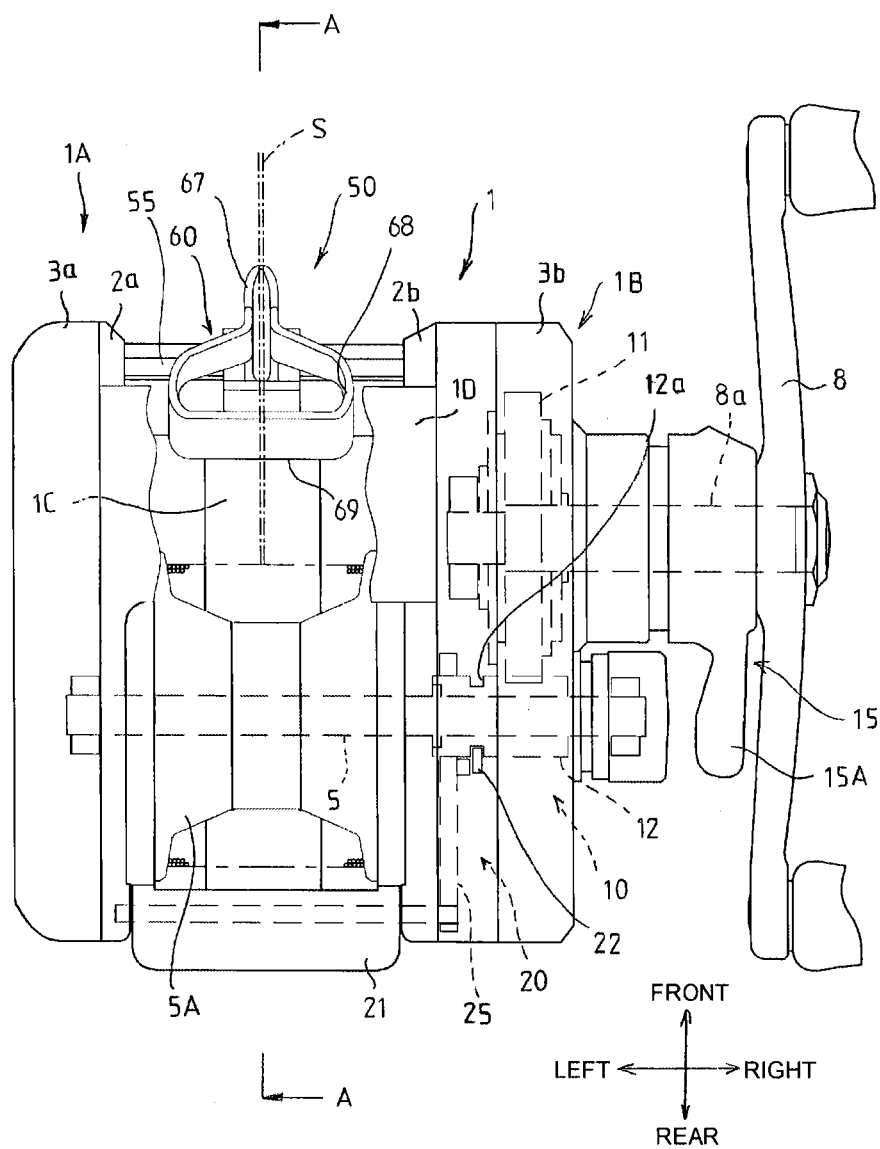
FIG. 1 is a plane view illustrating a fishing reel according to the present invention, in which a fishing line guide body is exposed.
Figure 2:
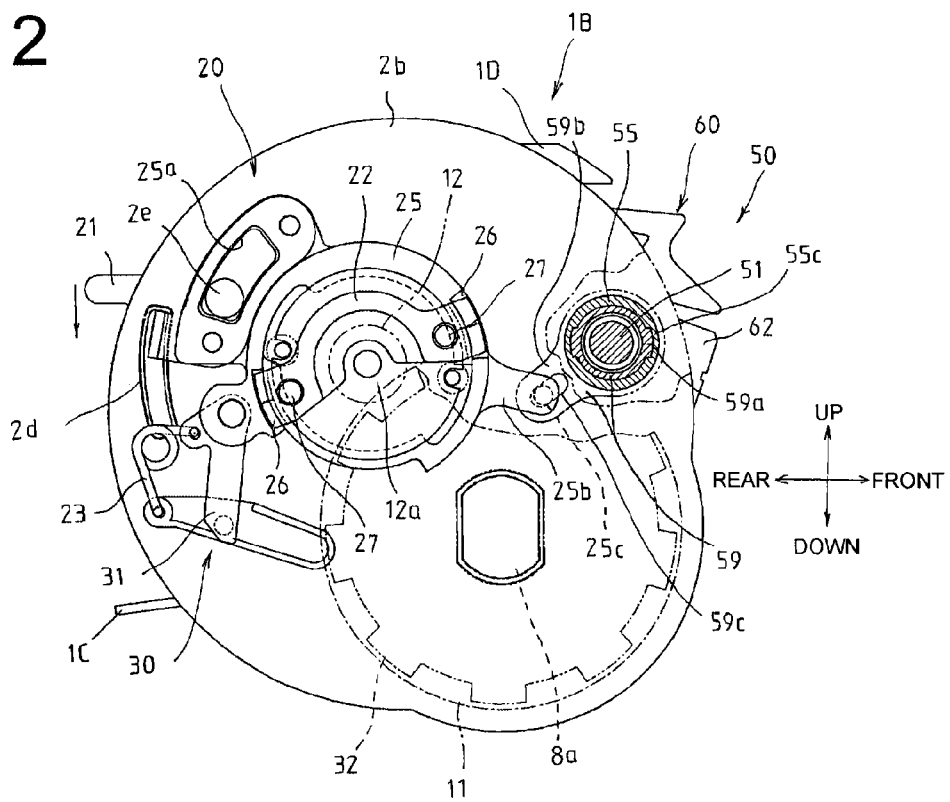
FIG. 2 is a side view illustrating a configuration of a power transmitting portion of a clutch mechanism in the fishing reel illustrated in FIG. 1 (clutch ON state).
Figure 3:
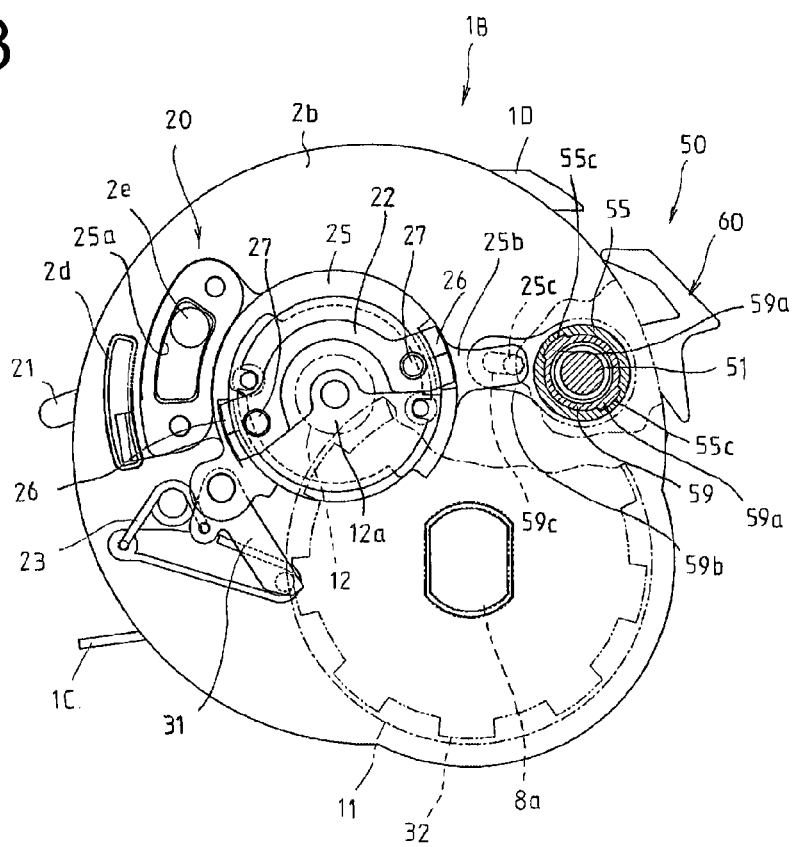
FIG. 3 is another side view illustrating the configuration of the power transmitting portion of the clutch mechanism in the fishing reel illustrated in FIG. 1 (clutch OFF state).

FIGS. 1 to 3 are views illustrating a fishing reel according to an embodiment of the present invention. FIG. 1 is a plane view in which a fishing line guide body is exposed; FIG. 2 is a side view illustrating a configuration of a power transmitting portion of a clutch mechanism (clutch ON state); and FIG. 3 is another side view illustrating the configuration of the power transmitting portion of the clutch mechanism (clutch OFF state). Note that front/rear (front and rear), right/left (right and left), and up/down (up and down) directions are defined as illustrated in FIGS. 1 and 2.

The fishing reel according to the present embodiment includes a reel body 1 provided with right and left side plates 1A and 1B that cover right and left frames 2a and 2b with right and left covers 3a and 3b. In the reel body, a reel leg 10 is integrally formed. The reel leg 1C is disposed between the right and left side plates and can be mounted on a fishing rod which is not illustrated. Additionally, a spool shaft 5 is rotatably supported via a bearing between the right and left frames 2a and 2b, and a spool 5A around which the fishing line is wound is integrally fixed to the spool shaft 5. Further, a thumb rest 1D on which a finger can be placed is provided between the right and left side plates on the upper side of the spool 5A.

According to the present embodiment, a handle 8 for rotationally driving the spool 5A is mounted on the right side plate 1B. A known power transmission mechanism 10 that transmits rotational driving force of the handle 8 to the spool shaft 5 is mounted in a space between the right frame 2b and the right cover 3b. Further, a known clutch mechanism 20 that switches the spool shaft 5 between a power transmitting state and a power cut-off state is provided between the right frame 2b and right cover 3b. The clutch mechanism 20 is configured to switch (change) from the clutch ON state (power transmitting state, also the fishing line winding state) to the clutch OFF state (power cut-off state, also the fishing line unwinding state) by pushing down a clutch switching operation member (hereinafter, referred to as an operation member) 21 disposed between the right and left side plates on the rear side of spool 5A. Incidentally, returning from the clutch OFF state to the clutch ON state can be achieved by rotating the handle 8, using an automatic return mechanism 30 described later.

Additionally, between the right and left side plates 1A and 1B, a level wind device 50 is disposed on the fishing line unreeled-direction side of the spool 5A. The level wind device 50 is configured to allow the fishing line guide body 60 to reciprocate in the right and left direction by rotating the handle 8, and the fishing line is threaded through the fishing line guide body 60. Accordingly, the level wind device 50 has a function to uniformly wind the fishing line around the spool 5A while spooling the fishing line.

The drive force transmission mechanism 10 includes a drive gear 11 associated with a drag mechanism 15, and a pinion 12 to be engaged with the drive gear 11. The drive gear 11 is rotatably mounted on a handle shaft 8a to which the handle 8 is fixed. The pinion 12 is movable along the spool shaft 5 in the axial direction (or movable along another shaft coaxially disposed with the spool shaft 5). Further, a circumferential groove 12a is formed on an outer periphery of the pinion 12, and the circumferential groove 12a is engaged with a yoke 22 of the clutch mechanism 20 described later, thereby moving the pinion 12 in the axial direction. In other words, switching between the power transmitting state (clutch ON) and the power cut-off state (clutch OFF) is executed by connecting or disconnecting the spool shaft 5 by moving the pinion 12 in the axial direction.

The drag mechanism 15 generates, as commonly known, desired drag force by mounting the drive gear 11 rotatably on the handle shaft 8a, making a friction member (not illustrated) contact this drive gear, and rotating an operation member 15A mounted on the handle shaft 8a. In other words, when the fishing line is unreeled, desired braking force is applied to the spool rotation.

The clutch mechanism 20 includes a clutch plate 25. The clutch plate 25 is rotatably supported with respect to the right frame 2b and is switched and held between the power transmitting state (clutch ON state) illustrated in FIG. 2 and the power cut-off state (clutch OFF state) illustrated in FIG. 3 by a switching spring 23. The clutch plate 25 is connected to the operation member 21 via a connecting hole 2d formed vertically on the right frame 2b, and a pin 2e formed on the right frame 2b in a projecting manner is inserted into a long hole 25a formed on the clutch plate 25, so as to guide the rotational drive.

A pair of cam faces 26 that can be engaged with the yoke 22 is formed on the surface of the clutch plate 25, and the yoke 22 is engaged with the circumferential groove 12a of the pinion 12. A tip side of the yoke 22 is held by a support pin 27 projected from the right frame 2b, and the yoke 22 is continuously biased to the clutch plate 25 side by a spring member (not illustrated) mounted on each support pin. Note that the state illustrated in FIG. 2 is when the yoke 22 is biased to the clutch plate 25 side by the spring member, and at this point, the pinion 12 is engaged with an engagement section formed at the end portion of the spool shaft and the clutch is in the ON state.

When the operation member 21 is pushed down in an arrow direction as illustrated in FIG. 2, the clutch plate 25 is rotated counterclockwise and disengages the pinion 12 via the cam face 26 and the yoke 22 from the engagement section formed at the end portion of the spool shaft, thereby switching the clutch to the OFF state as illustrated in FIG. 3. Note that this state is maintained by the switching spring 23.

Further, the automatic return mechanism 30 is provided on the clutch plate 25 to change the clutch from the OFF state to the ON state. The automatic return mechanism 30 includes a kick member 31 integrally formed with the clutch plate, and a ratchet 32 unrotatably fixed to the handle shaft 8a. The kick member 31 is arranged and configured so as to enter the inside of a rotating locus of the ratchet 32 as illustrated in FIG. 3 when the clutch is switched to the OFF state from the ON state. Accordingly, in the case of operating the handle 8 to execute spooling in the clutch OFF state, the kick member 31 is kicked by the rotation of the ratchet 32, and automatically the clutch plate 25 is returned to the position of the clutch ON state and held by the spring force of the switching spring 23. Note that the clutch can be returned by pushing up the operation member 21.

Figure 4:
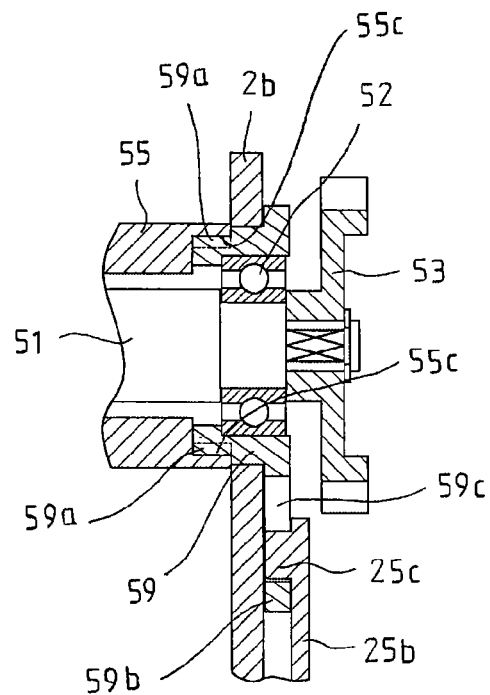
FIG. 4 is a cross-sectional view illustrating a configuration of a connected portion between a clutch plate and a rotary plate that rotates the fishing line guide body.
Figure 5:
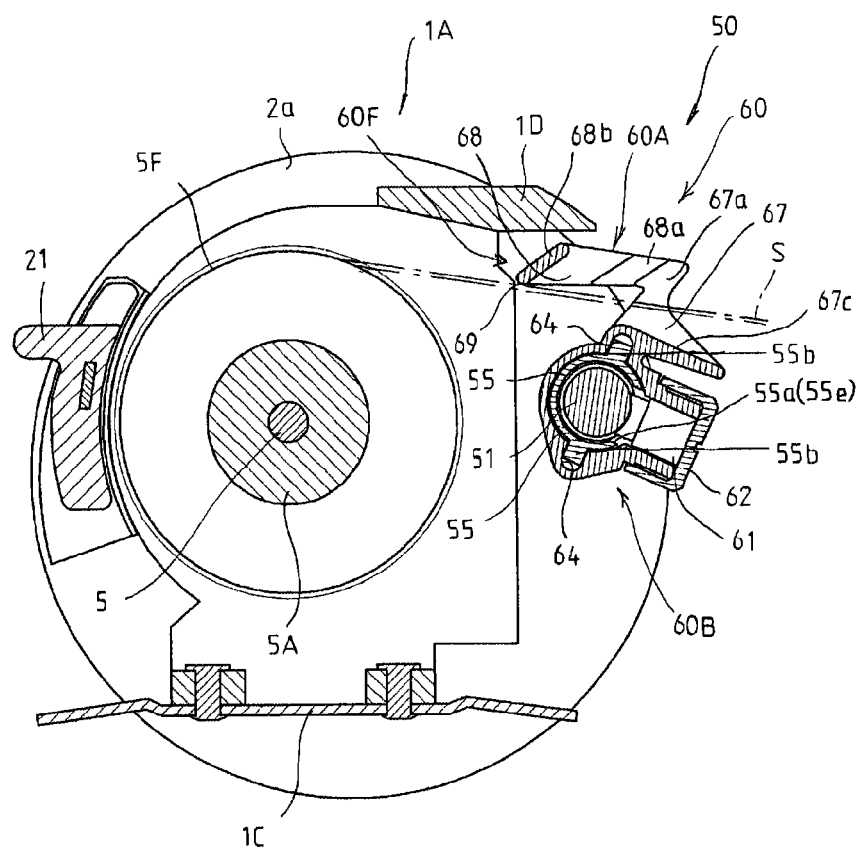
FIG. 5 is a cross-sectional view of the fishing reel illustrated in FIG. 1 taken along a line A-A, illustrating a case where the fishing line guide body is in a fishing line winding state (clutch ON state).
Figure 6:
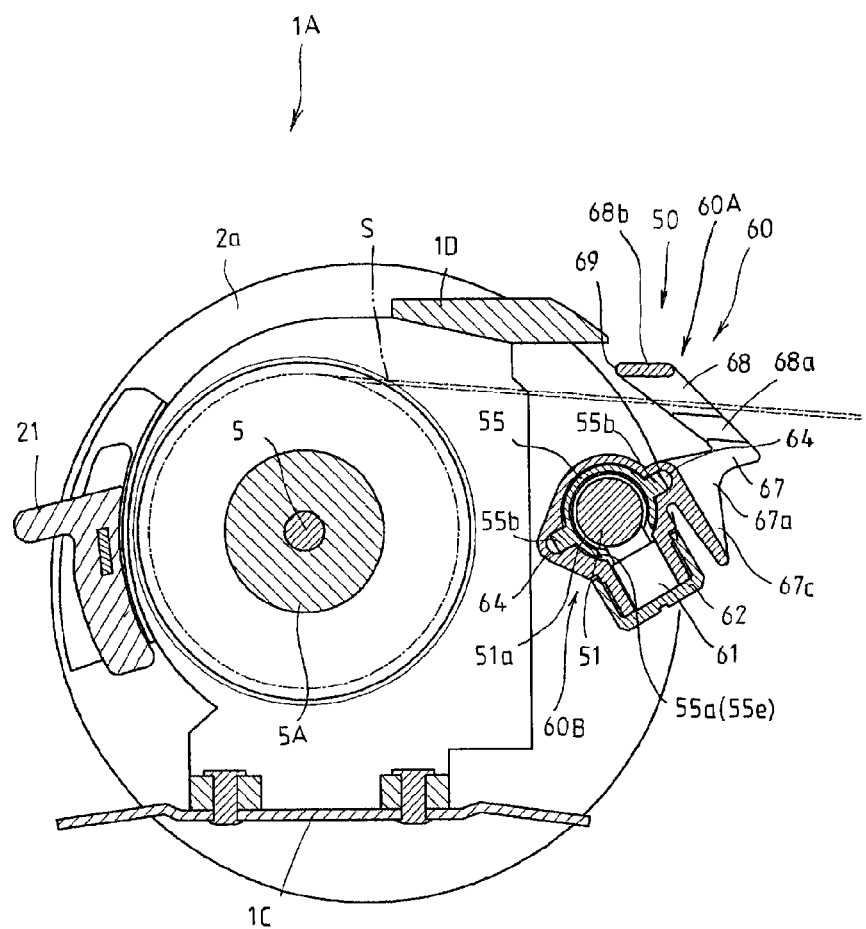
FIG. 6 is another cross-sectional view of the fishing reel illustrated in FIG. 1 taken along the line A-A, illustrating a case where the fishing line guide body is in a fishing line unwinding state (clutch OFF state).
Figure 7:
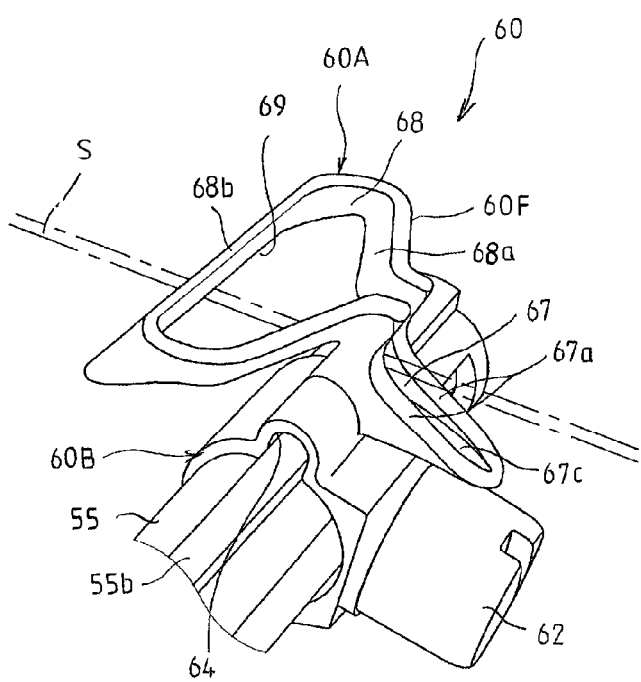
FIG. 7 is an enlarged perspective view of the fishing line guide body (clutch ON state).
Figure 8:
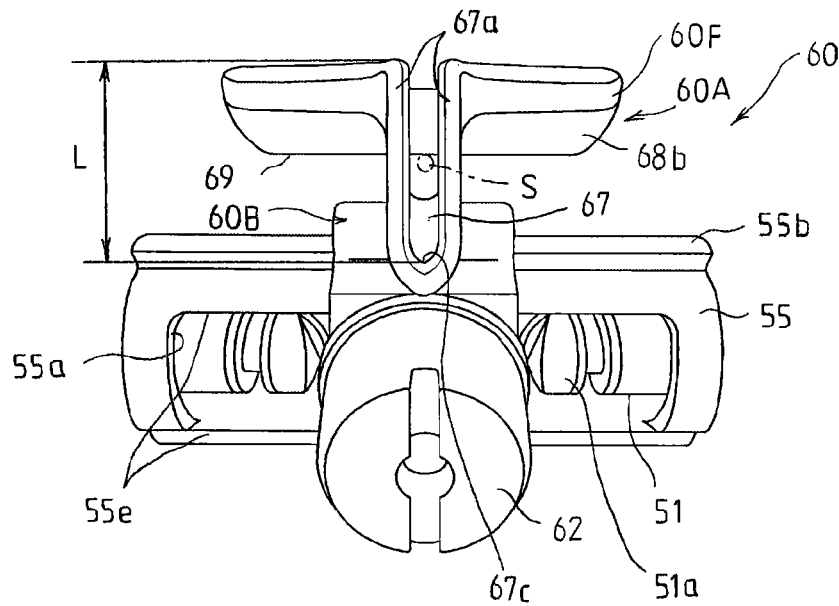
FIG. 8 is a front view of the fishing line guide body illustrated in FIG. 7.
Figure 9:
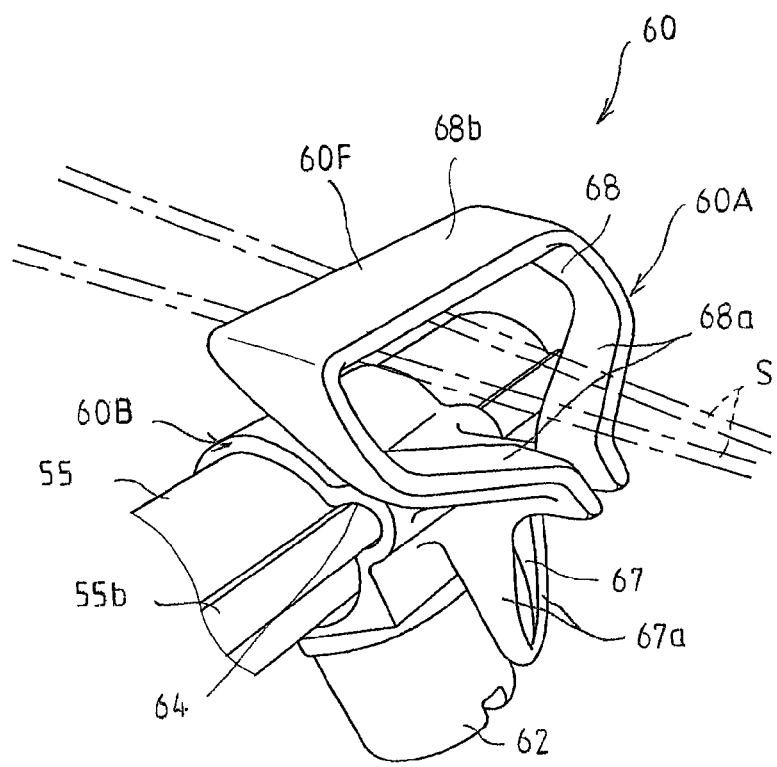
FIG. 9 is an enlarged perspective view of the fishing line guide body (clutch OFF state).
Figure 10:
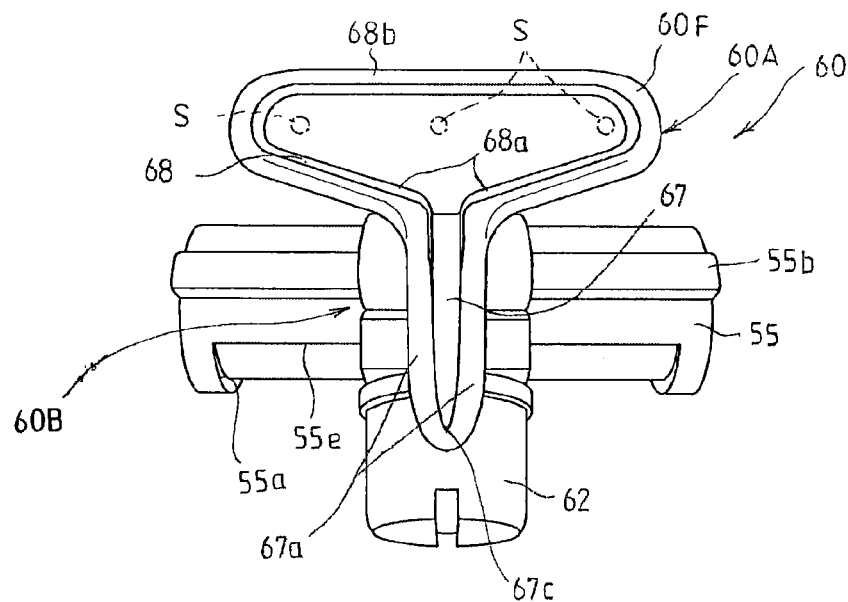
FIG. 10 is a front view of the fishing line guide body illustrated in FIG. 9.

The level wind device 50 is disposed between the right and left side plates on the front side of the spool 5A. A configuration of the level wind device 50 will be described below with reference to all of FIGS. 4 to 10. Note that FIG. 4 is a cross-sectional view illustrating a configuration of a connecting portion between the clutch plate and the rotary plate that rotates the fishing line guide body, FIG. 5 is a cross-sectional view of the fishing reel illustrated in FIG. 1 taken along a line A-A, illustrating a case where the fishing line guide body is in the fishing line winding state (clutch ON state), FIG. 6 is a view illustrating a case in which the fishing line guide body is in the fishing line unwinding state (clutch OFF state), FIG. 7 is an enlarged perspective view of the fishing line guide body (clutch ON state), FIG. 8 is a front view of the fishing line guide body illustrated in FIG. 7, FIG. 9 is an enlarged perspective view of the fishing line guide body (clutch OFF state), and FIG. 10 is a front view of the fishing line guide body illustrated in FIG. 9.

The level wind device 50 includes a fishing line guide body 60 through which a fishing line S wound around the spool 5A is threaded. The fishing line guide body 60 is rotatably supported between the right and left side plates via the bearing 52 (see FIG. 4), and is reciprocated in the right and left direction by a screw shaft (worm shaft) 51 rotatably driven via the drive force transmission mechanism 10. In other words, on the right frame side of the screw shaft 51, an input gear 53 is disposed adjacent to the drive gear 11 mounted on the handle shaft 8a, and the input gear 53 is engaged with a connection gear (not illustrated) which integrally rotates with the handle shaft 8a The screw shaft 51 is rotationally driven in synchronization with the rotational drive of the handle 8 via the connection gear and the input gear 53.

The screw shaft 51 is housed inside a tubular body (cylindrical body) 55 rotatably supported between the right and left side plates. A long hole 55a extending in the axial direction is formed on an outer surface of the tubular body 55, partly exposing a spiral groove 51a formed on a surface of the screw shaft 51 along the axial direction. Further, the fishing line guide body 60 through which the fishing line S is threaded includes a fishing line threading section 60A and a holding portion 60B that are formed integrally, and the holding portion 60B is disposed and formed so as to surround the tubular body 55.

The holding portion 60B holds, inside thereof, a slidable member 61 to be engaged with the spiral groove 51a via the long hole 55a. The slidable member 61 is fixed to the holding portion 60B by a cap nut 62. Additionally, the fishing line guide body 60 is moved along the axial direction by means of the rotation of the screw shaft 51 and by means of an engaged relation between the spiral groove 51a and the slidable member 61 while being prevented from rotating around the tubular body 55. In the configuration according to the present embodiment, rotation stoppers 55b extending along the axial direction are formed on an outer periphery of the tubular body 55 in a projecting manner, and the rotation is stopped by engaging the engagement section 64 of the holding portion 60B with the rotation stopper 55b. More specifically, the rotation stoppers 55b are formed as projections extending in the axial direction on the outer periphery of the tubular body 55 (a pair of projections are provided at the interval of 180 degrees as illustrated in FIGS. 4 and 5), and the engagement section 64 is formed as a recess to be engaged with such projections.

As described above, since the rotation stopper 55b is formed integrally with the tubular body 55 housing the screw shaft 51, it is not necessary to provide a guide shaft to stop the rotation of the fishing line guide body 60 like the related art. As a result, the structure of the level wind device can be simplified.

Further, when the screw shaft 51 is rotationally driven, the fishing line guide body 60 is reciprocatingly driven between the right and left side plates via the slidable member 61. The fishing line guide body 60 according to the present embodiment is configured switchable between the fishing line winding state and the fishing line unwinding state by rotating in conjunction with the ON/OFF state of the clutch mechanism 20. In this case, the fishing line guide body 60 is rotationally driven by rotationally driving the tubular body 55.

Now, a power transmission path from the clutch mechanism 20 to the tubular body 55 will be described concretely.

A projected piece 25b projected to the front side of the reel body is formed on the clutch plate 25, and at the tip thereof an engagement projection 25c projected to the right frame side is integrally formed. On the other hand, on the right frame 2b, a rotary plate 59 is held at a portion supporting the screw shaft 51, and the tubular body 55 is fixed and prevented from rotating with the rotary plate 59 on the inner surface side of the right frame 2b. In other words, a projection 59a radially projecting is formed on the rotary plate 59 and a recess 55c formed at an end portion of the tubular body 55 is engaged with the projection 59a. Thus, both components are fixed (integrally rotatable) on the inner surface side of the right frame 2b.

The rotary plate 59 is rotatably supported between the right frame 2b and an outer ring of the bearing 52 which rotatably supports the screw shaft 51. A connecting piece 59b to be engaged with the projected piece 25b of the clutch plate 25 is formed on the rotary plate 59 along an outer surface of the right frame 2b. Further, a long hole 59c is formed on connecting piece 59b, and the engagement projection 25c of the projected piece 25b of the clutch plate 25 is loosely inserted into the long hole 59c. As a result, the rotary plate 59 is rotated around the axis of the screw shaft 51 along with the rotation of the clutch plate 25 as illustrated in FIGS. 2 and 3. Therefore, the rotary plate 59 is switched between two positions together with the clutch plate that is switched and held between the fishing line winding state and the fishing line unwinding state by the switching spring 23.

The fishing line guide body 60 is rotationally driven in the front and rear direction in front of the spool by rotationally driving the tubular body 55 via the rotary plate 59. Now, a configuration of the fishing line guide body 60 will be concretely described.

The fishing line guide body 60 includes the fishing line threading section 60A through which the fishing line is threaded from the spool 5A. The fishing line threading section 60A is configured as a frame body 60F made of the material, such as SUS and titanium, having small resistance against the fishing line, and integrally formed with the holding portion 60B as illustrated in FIGS. 7 to 10. More specifically, the fishing line threading section 60A includes the fishing line guide section 67 which is narrow (like a narrow groove) in the right and left direction, and a fishing line unwinding section 68 which is wide and substantially symmetrically expanding in the right and left direction above the fishing line guide section 67. In this case, the fishing line unwinding section 68 is formed in an approximate oval shape expanding in the right and left direction in the front view (front view seen from the front side along the threaded fishing line S) when switching to the fishing line unwinding state as illustrated in FIG. 10. Both side walls of the fishing line unwinding section 68 are formed of inclined guide surfaces 68*a* which are inclined with respect to the fishing line guide section 67 and guide the fishing line S. The fishing line guide section 67 is formed at the approximately center bottom portion of the fishing line unwinding section 68.

Viewing from the side wall in the fishing line unwinding state, the frame body 60F including the fishing line unwinding section 68 is inclined with respect to the front and rear direction (formed in a gradually standing-up manner toward the rear side). An upper wall 68*b* defining the fishing line unwinding section 68 is positioned along the front and rear direction in the fishing line unwinding state (see FIGS. 6 and 9) such that the fishing line unwinding section can be widen as much as possible. A rear end edge 69 of the upper wall 68*b* is positioned so as to be in contact with the fishing line S threaded inside the fishing line unwinding section 68 from above when rotating from the fishing line unwinding state to the fishing line winding state. Thus, the rear end edge 69 of the upper wall 68*b* according to the present embodiment has a function as a regulator configured to regulate the fishing line S (hereinafter, the rear end edge is referred to as the regulator 69).

The regulator 69 is integrally formed with the frame body 60F. The regulator 69 has a positional relation so as to be within a range of a vertical length L of the fishing line guide section 67 in the front view (viewed from the front side along the fishing line S as illustrated in FIG. 8) when the rotation of the fishing line guide body 60 is rotated from the fishing line winding state to the fishing line unwinding state in conjunction with the clutch mechanism 20. In other words, with the above-described positional relation, when the fishing line guide body 60 is rotated from the fishing line unwinding state to the fishing line winding state, the fishing line S positioned anywhere of the fishing line unwinding section 68 is pressed by the regulator 69 and can be stably guided to the fishing line guide section 67 along the inclined guide surface 68*a*. Also, with this positional relation, the fishing line S can be stably prevented from slipping out of the fishing line guide section 67 during the fishing line winding state.

Incidentally, the regulator 69 is not necessarily formed at the rear end edge of the upper wall 68*b* of the flat frame body 60F because, as far as the fishing line guide body 60 is rotationally driven like the present embodiment, a distance from the rotary axis (center of screw shaft 51) or a downward shifting distance of the fishing line can be suitably adjusted according to a rotation angle of the tubular body 55. In other words, the regulator may be formed by bending any part of the frame body 60F constituting the fishing line threading section 60A, and the form thereof may be appropriately modified.

The fishing line guide section 67 having a narrow width in the right and left direction expands in the up and down direction (vertical direction), prevents the fishing line S threaded therein from unstably moving in the right and left direction, and has a function to stably wind the fishing line onto the spool 5A in parallel (a function to improve the spooled condition).

In the above-described configuration, both walls 67*a* constituting the fishing line guide section 67 preferably extend so as to cover an upper part of the cap nut 62 fixing the slidable member 61, as illustrated in FIGS. 5 and 6. With this configuration, it becomes possible to effectively prevent the fishing line threaded inside the fishing line guide section 67 from entwining at the cap nut 62. Also, a bottom surface 67*c* of the fishing line guide section 67 is preferably formed of an inclined surface which is inclined gradually downward toward the front side in the fishing line winding state illustrated in FIG. 5. By thus forming the bottom surface, it is possible to reduce frictional resistance applied to the fishing line unreeled from the spool in an inclined manner.

In the fishing line guide body 60 according to the present embodiment, a line slippage preventing regulator that regulates the fishing line not to slip out of the narrow fishing line guide section 67 to the wide fishing line unwinding section 68 when the fishing line S is unreeled. Now, the line slippage preventing regulator will be described in detail.

Normally, in the fishing reel for casting, the fishing line guide body 60 is controlled not to slide in the right and left direction in order to reduce resistance applied to rotation of the spool 5A while unwinding the fishing line. In other words, in the case where the fishing line guide body 60 is slid, rotary load from the level wind device side acts on rotation of the spool 5A and deteriorates rotation property, thereby causing reduction of the flying distance. Thus, the fishing line guide body 60 is configured not to synchronously reciprocate in the right and left direction when the spool is freely rotated.

Figure 11:
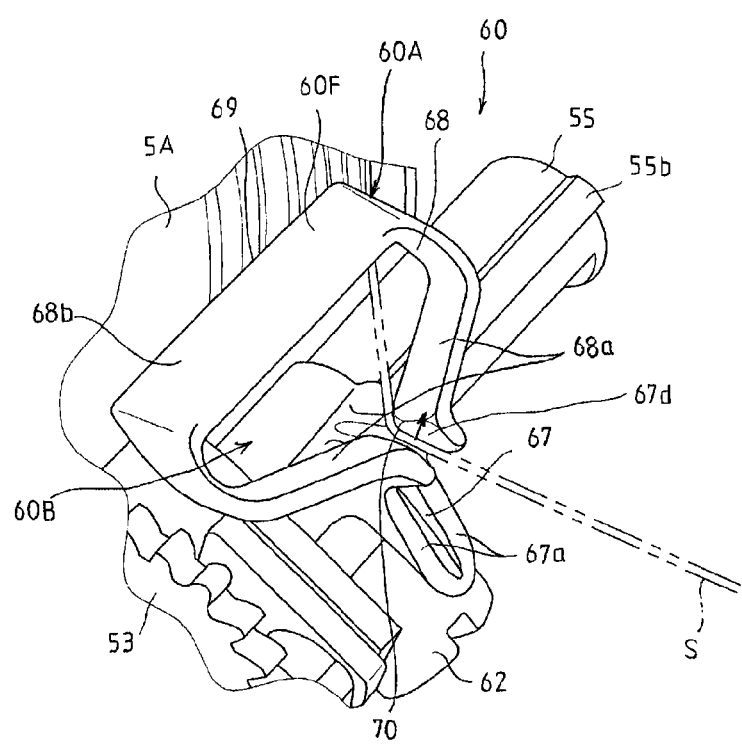
FIG. 11 is a perspective view illustrating a state of a fishing line when a positional relation between the fishing line guide body and a position of unwinding the fishing line in a spool is deviated.
Figure 12:
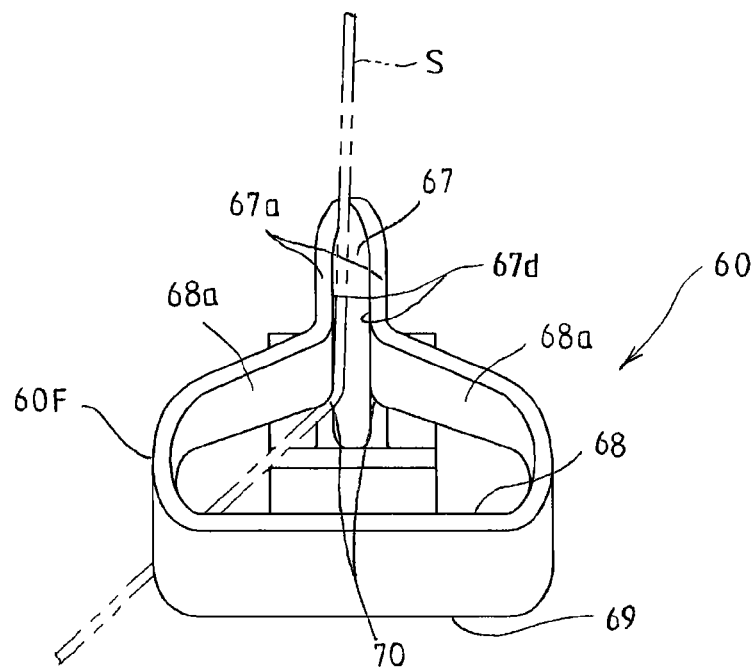
FIG. 12 is a plane view illustrating the state illustrated in FIG. 11.

Due to this, in some instances, the fishing line guide body 60 may be stopped at one end of the right and left direction, and also the position of the fishing line unwound from the spool 5A may be positioned at the other end as illustrated in FIGS. 11 and 12. Further, in the case where the highly loaded unwinding force is applied to the fishing line S with the highly set drag force of the drag mechanism 15 while such a positional error is occurring, the fishing line S may be unwound, rubbing the side surface of the fishing line guide body 60, namely, facing inner surfaces 67*d* of the both walls 67*a* of the fishing line guide section (narrow groove) 67 in which the fishing line is threaded.

At this point, the fishing line S moves upward, being guided by the inner surfaces 67*d* as illustrated by an arrow in FIG. 11, and then tries to run through the fishing line guide section 67, hitting hard the regulator 69 (applying strong force to push up the regulator 69). Further, in the case where the fishing line actually moves to the fishing line unwinding section 68 and the fishing line winding operation is executed in this state, the condition of the fishing line at the beginning of winding around the spool 5A becomes unstable and the fishing line is partly wound unevenly around the spool, thereby deteriorating the spooled condition. As a result, the unevenly wound part may resist the unwinding and reduce the flying distance at the time of unwinding the fishing line next time.

According to the present embodiment, even in the case where the highly loaded unwinding force is applied to the fishing line S in the event of the positional relation illustrated in FIGS. 11 and 12, the line slippage preventing regulator provided at the fishing line guide body prevents the fishing line S from easily slipping out of the narrow fishing line guide section 67 and moving to the wide fishing line threading section 68.

Figure 13:
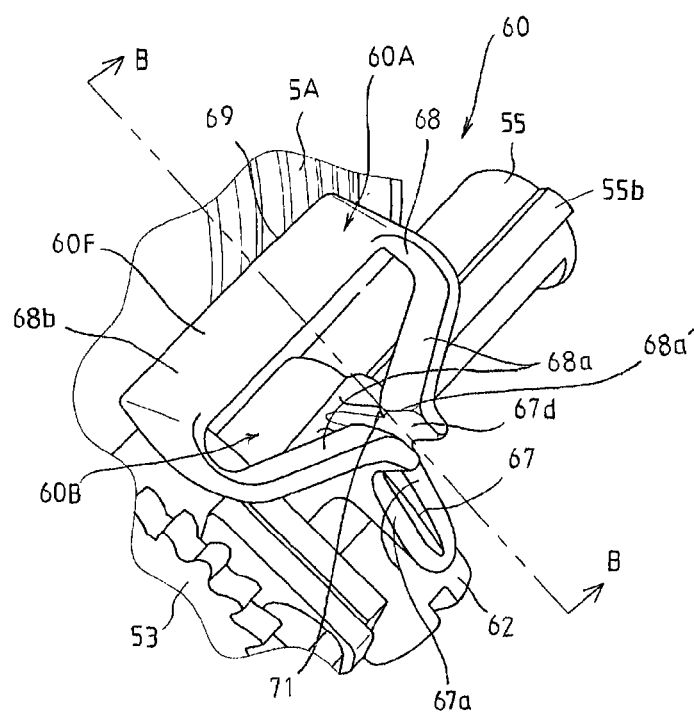
FIG. 13 is a perspective view illustrating the state in which the fishing line guide body and the position of unwinding the fishing line in the spool are deviated.
Figure 14:
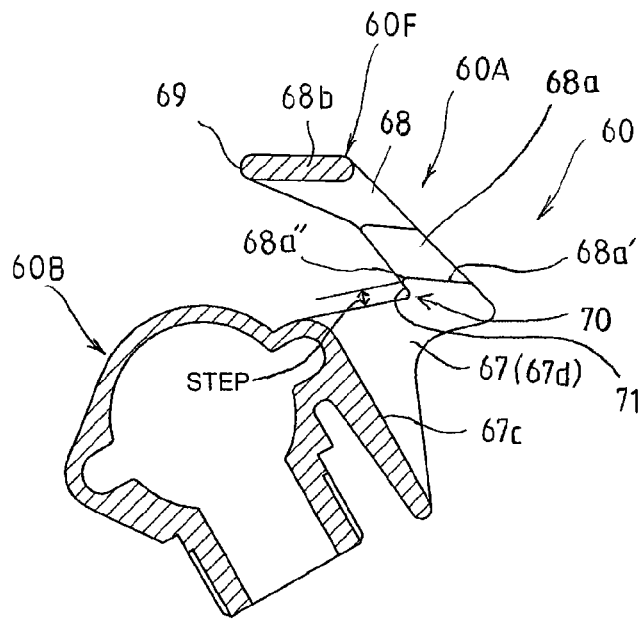
FIG. 14 is a cross-sectional view taken along a line B-B in FIG. 13.

The line slippage preventing regulator 70 according to the present embodiment is formed on an end surface facing the spool side of the fishing line guide body 60 as illustrated in FIGS. 13 and 14. More specifically, the slippage prevention control portion is forming by creating a step at a rear edge 68*a*" on the spool side of a lower edge 68*a*' of the inclined guide surface 68*a*. The step has, as illustrated in FIGS. 13 and 14, its highest point at the rear edge 68*a*" on the spool side of the lower edge 68*a*', facing the spool side. The line slippage preventing regulator is formed by configuring this step as an inclined surface (referred to as a line hooking surface) 71 inclined downward toward the front side. Therefore, even in the case where the positional relation between the fishing line guide body 60 and the position of unwinding the fishing line in the spool 5A is as illustrated in FIGS. 11 and 12, the line hooking surface 71 prevents the fishing line S from moving to the fishing line threading section 68 along the inclined guide surface 68*a* at the time of unwinding the fishing line with the drag force.

Note that the above-described line slippage preventing regulator 70 (line hooking surface 71) is formed on each of the both walls 67*a* of the narrow fishing line guide section 67.

Next, function and effect of the fishing reel configured as described above will be described.

When the operation member 21 positioned at the rear side of the spool 5A is pushed down in the clutch ON state illustrated in FIGS. 2 and 5, the clutch plate 25 constituting the clutch mechanism 20 is rotated counterclockwise and held in the state illustrated in FIG. 3 by the switching spring 23. At this point, the cam face 26 formed on the surface of the clutch plate 25 shifts the yoke 22 in the axial direction and separates the pinion 12 from the spool shaft 5 (clutch OFF state). Further, the rotary plate 59 is rotated around the axis of the screw shaft 51 in conjunction with the clutch plate 25 rotated by the above operation, and the tubular body 55 fixed on this (stopped from rotating by this) is also rotated from the position illustrated in FIG. 2 (FIG. 5) to the position illustrated in FIG. 3 (FIG. 6).

Therefore, since the fishing line guide body 60 is held by the tubular body 55, the fishing line guide body 60 is rotated from the state illustrated in FIG. 5 (FIG. 7 and FIG. 8) to the state illustrated in FIG. 6 (FIG. 9 and FIG. 10). Then, the fishing line guide body 60 thus rotated is changed to the state in which the spool 5A can be freely rotated (fishing line unwinding state), and the fishing line S threaded inside the fishing line guide section 67 is released from the control of the regulator 69 and moves to the fishing line unwinding section 68. Note that the fishing line can move to the fishing line unwinding section 68 immediately after the fishing line is released from the control of the regulator 69, because, in the fishing line unwinding state, an amount of the fishing line wound around the spool 5A is normally large.

In this state, the spool 5A is in the freely rotatable state, so that the fishing line S is unwound by casting operation, for example. In this case, the fishing line guide body 60 is rotated in front of the spool 5A in the state illustrated in FIGS. 6, 9 and 10, and the fishing line unwinding section 68 having the wide width in the right and left direction receives less contact resistance from its inner surface, thereby not reducing the flying distance of a terminal tackle. In other words, it is possible to reduce the resistance against unwinding the fishing line from the fishing line guide body 60 at the time of unwinding the fishing line.

Further, when the handle 8 is operated for the winding operation in order to return the clutch mechanism 20 to the ON state, the clutch plate 25 is automatically returned to the position illustrated in FIG. 2 by the automatic return mechanism 30. In response to the clutch plate 25 returned to the ON state, the tubular body 55 is rotated to the state illustrated in FIGS. 2 and 5 via the rotary plate 59, and the fishing line guide body 60 is switched to the position illustrated in FIGS. 5, 7, and 8. At this point, the fishing line S positioned at any place of the fishing line unwinding section 68 is contacted and pressed by the rotating regulator 69, and surely guided along the inclined guide surface 68*a* of the fishing line unwinding section 68 to the fishing line guide section 67 positioned in the center. Also, as illustrated in FIG. 8, the fishing line S never slips out of the fishing line guide section 67 in the fishing line winding state because of the regulator 69.

After that, the screw shaft 51 of the above-described level wind device 50 is rotationally driven via the connection gear provided at the handle shaft 8*a* and the input gear 53 engaged with this by turning the handle 8 for the winding operation. By rotationally driving the screw shaft 51, the fishing line guide body 60 is reciprocated in the right and left direction along the tubular body 55 via the slidable member 61 engaged with the spiral groove 51*a* formed on the outer peripheral surface of the screw shaft 51. In this case, the fishing line guide body 60 is reciprocated in the right and left direction and driven without rotating around the shaft because the rotation stopper 55*b* extending along the axial direction is formed on the outer periphery of the tubular body 55. This allows the fishing line S to be stable wound onto the spool 5A in parallel by means of the fishing line guide section 67 having the narrow width in the right and left direction. Further, the stable parallel winding can be secured as the fishing line does not slip out of the fishing line guide section 67 by means of the position of the regulator 69.

Incidentally, in the case where the amount of the fishing line S wound around the spool 5A is little, e.g., in the case where a large amount of the fishing line has been unwound, the fishing line S positioned in the fishing line guide section 67 does not have to contact the regulator 69.

According to the fishing reel having the above-described configuration, it is not necessary to provide the pillar which vertically moves between the right and left side plates to control the fishing line path like the related art. Therefore, the number of components can be reduced and the structure can be simplified. Also, the size of the reel body 1 in the front and rear direction can be reduced because the pillar is not necessary to be disposed on the rear side of the fishing line guide body 60. Moreover, since the fishing line path is controlled only by the shape of the fishing line guide body 60, the shape of the fishing line unwinding section 68 where the fishing line S is positioned at the time of fishing line unwinding can be easily enlarged and the resistance against unwinding the fishing line can be more reduced.

Additionally, when the clutch is turned ON after casting, the position of unwinding the fishing line wound around the spool and the position of the fishing line guide body may be largely deviated; however, even in the case the fishing line is unwound in this state, the fishing line S is prevented from moving to the fishing line unwinding section 68 by means of the above-described line slippage preventing regulator 70. In other words, as illustrated in FIG. 12, the fishing line S is bent from the rear edge position of the inner surface 67*d* of the both walls 67*a* of the fishing line guide section 67, but the fishing line is hardly moved upward to the fishing line unwinding section 68 because the line hooking surface 71 (line slippage preventing regulator 70) is disposed in the bent portion. Therefore, the fishing line is wounded around the spool 5A via the narrow fishing line guide section 67 at the time of winding the fishing line S. As a result, the spooled condition becomes stable without any uneven winding at the beginning of winding.

After the spooled condition is stabilized, the resistance against unwinding operation caused by the uneven spooled condition may not be applied at the next casting. Thus, further unwinding is smoothened and the flying distance may not be reduced. Further, since the fishing line S is prevented from slipping into the fishing line unwinding section 68 by means of the line slippage preventing regulator 70, the regulator 69 does not press hard the fishing line. As a result, there is no damage given to the fishing line and the fishing line guide body 60. Moreover, the fishing line smoothly moves out from the fishing line guide section 67 to the fishing line unwinding section 68 when the clutch is turned OFF to unwind the fishing line because the line slippage preventing regulator 70 is formed on the end surface of the fishing line guide body 60 on the spool side like the present embodiment.

Besides the above-described embodiment, the fishing line guide body formed with the line slippage preventing regulator 70 may be formed without the regulator 69 that presses the fishing line. A second embodiment of the present invention will be described below with reference to FIGS. 15 to 20.

Figure 15:
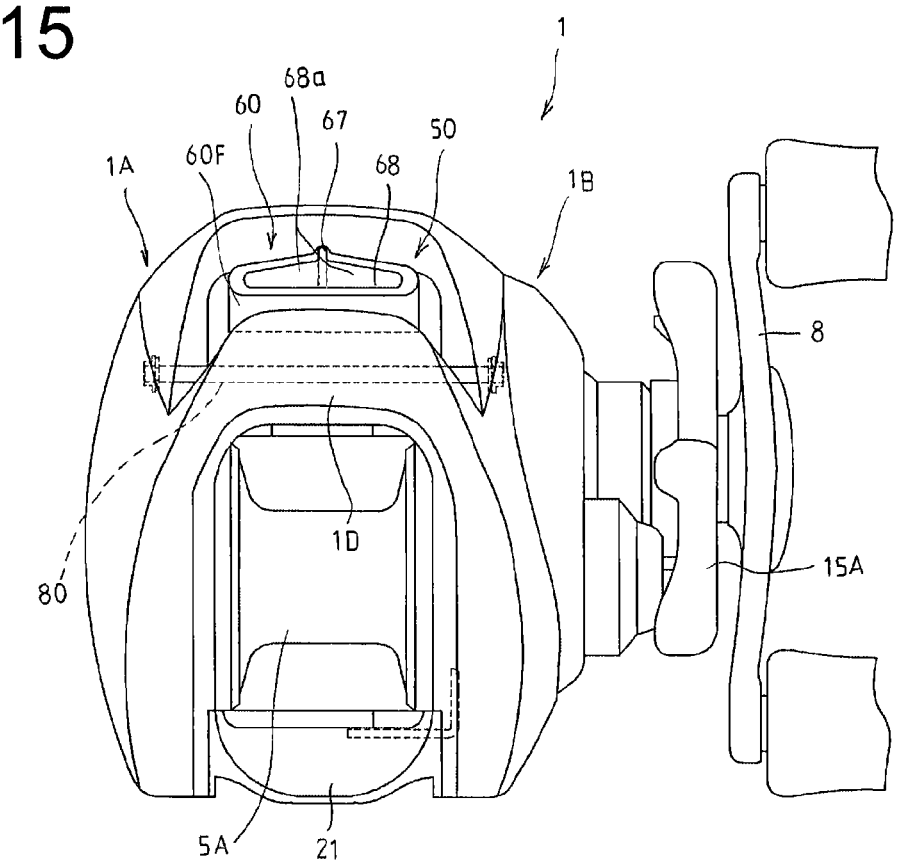
FIG. 15 is a plane view illustrating a fishing reel according to a second embodiment of the present invention.
Figure 16:
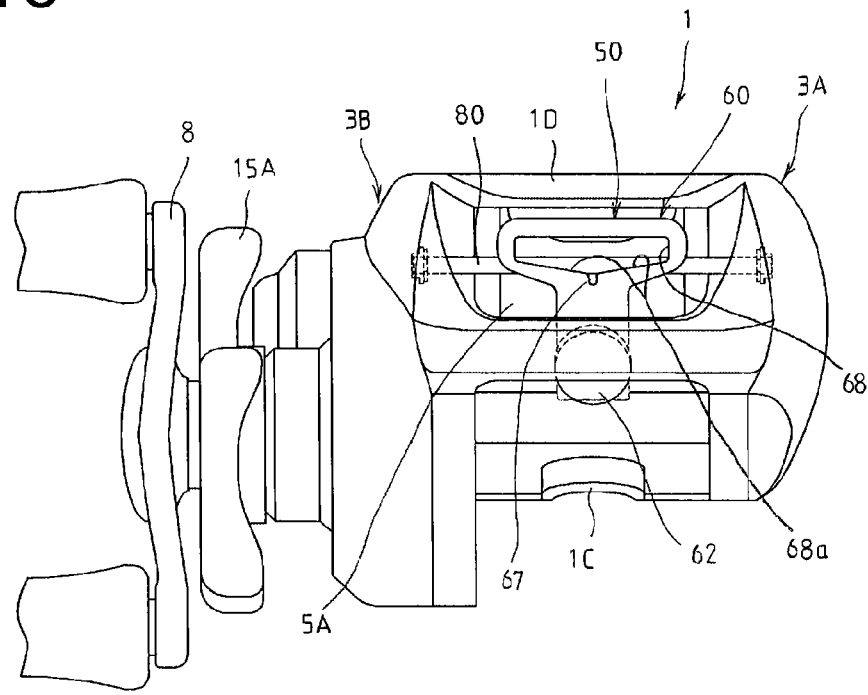
FIG. 16 is a front view of the fishing reel illustrated in FIG. 15.
Figure 17:
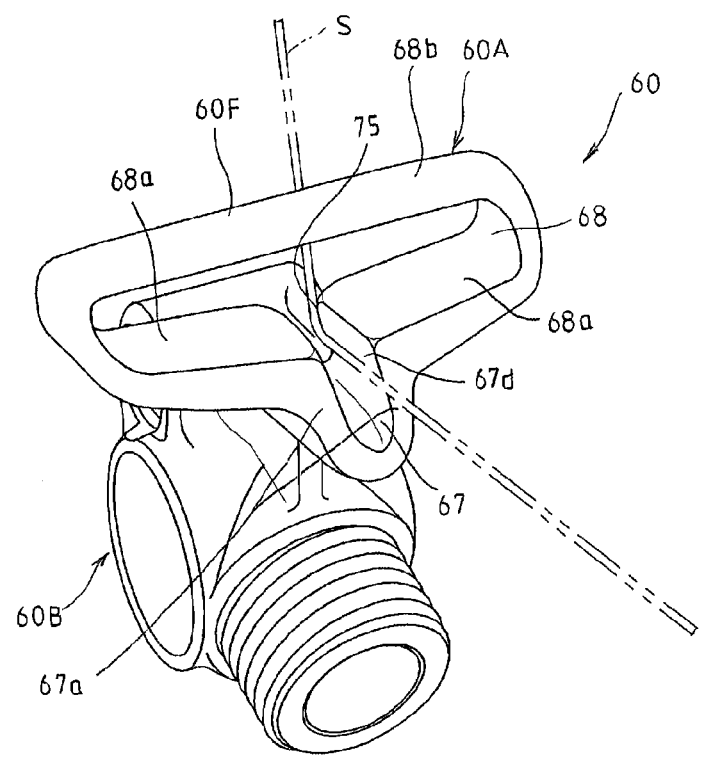
FIG. 17 is a perspective view illustrating a state of the fishing line when the positional relation between the position of unwinding the fishing line and the fishing line guide body is deviated in the spool.
Figure 18:
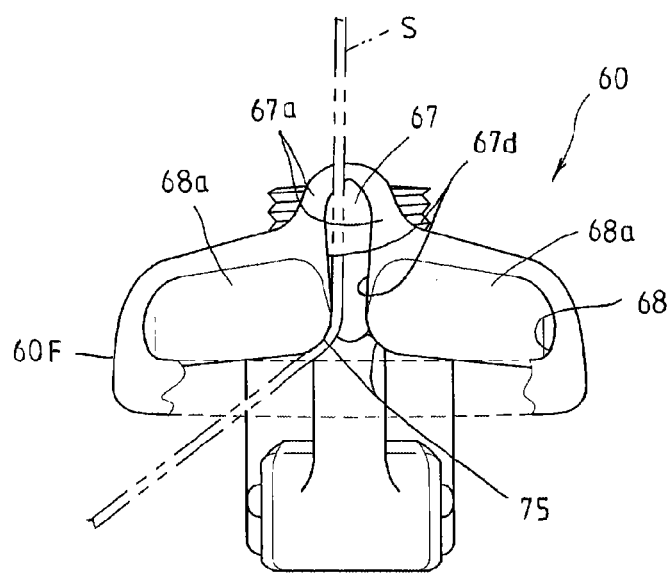
FIG. 18 is a plane view illustrating the state illustrated in FIG. 17.
Figure 19:
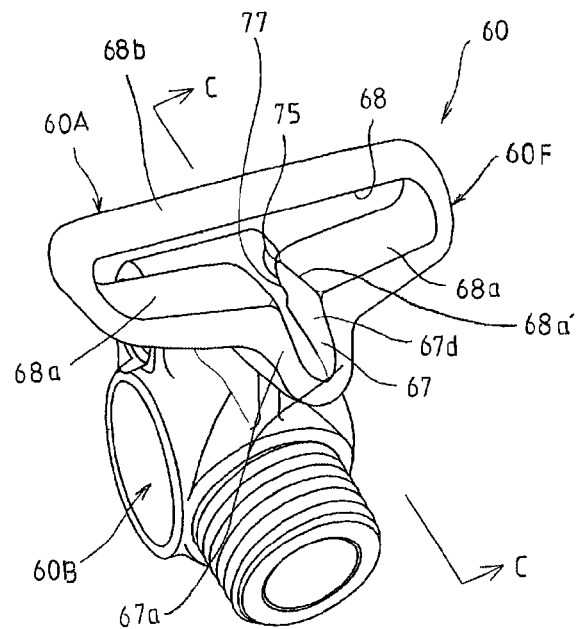
FIG. 19 is a perspective view illustrating the state in which the fishing line guide body and the position of unwinding the fishing line in the spool are deviated.
Figure 20:
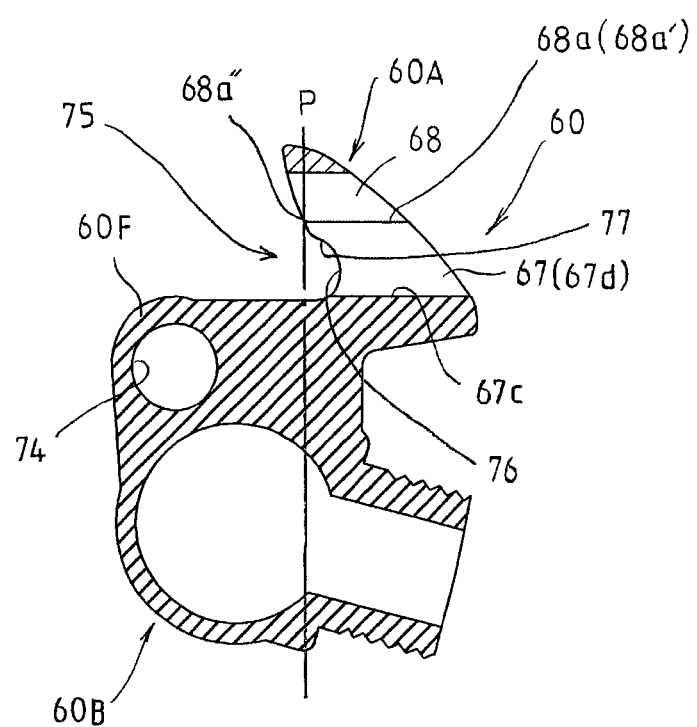
FIG. 20 is a cross-sectional view taken along a line C-C in FIG. 19.

Note that FIG. 15 is a plane view illustrating a fishing reel, FIG. 16 is a front view of the fishing reel, FIG. 17 is a perspective view illustrating a state of the fishing line when the positional relation between the position of unwinding the fishing line and the fishing line guide body is deviated in the spool, FIG. 18 is a plane view illustrating the state illustrated in FIG. 17, FIG. 19 is a perspective view illustrating the state in which the position of unwinding the fishing line and the fishing line guide body are deviated in the spool, and FIG. 20 is a cross-sectional view taken along a line C-C in FIG. 19.

In the following, a detailed description for the same components as those of the above-described embodiment will be omitted by denoting the components by the same reference symbols.

According to the present embodiment, a shaft 80 is disposed below a thumb rest 1D between right and left side plates 1A and 1B. When a clutch is switched from OFF to ON, a fishing line S is pressed by the shaft 80 such that the fishing line S may be guided to a narrow fishing line guide section 67 from a wide fishing line unwinding section 68. For this reason, the shaft 80 is supported vertically movable with respect to a reel body in conjunction with a clutch mechanism. Accordingly, when the clutch is switched to an OFF state, the shaft moves upward such that the fishing line moves to the fishing line unwinding section 68, and when the clutch is switched to an ON state, the shaft presses the fishing line so as to guide the fishing line to the fishing line guide section 67 (a more detailed description for the shaft 80 will be omitted here).

A fishing line guide body 60 is configured not to rotate in the front and rear direction. Therefore, the rear end edge of an upper wall 68b, defining the fishing line unwinding section 68 and being along the front and rear direction, does not have a function as a regulator. Additionally, as illustrated in FIG. 20, a through hole 74 is formed at a holding portion 60B of the fishing line guide body 60. A shaft (not illustrated) bridged between the right and left side plates of the reel body is inserted through the through hole and serves as a rotation stopper to stop rotation of the fishing line guide body 60 that is reciprocated in the right and left direction.

A line slippage preventing regulator 75 according to the present embodiment is formed on an end surface facing the spool side of the fishing line guide body 60 as illustrated in FIGS. 19 and 20. More specifically, the line slippage preventing regulator is formed below a rear edge 68a" on the spool side of a lower edge 68a' of an inclined guide surface 68a on both sides of the wide fishing line unwinding section 68. In other words, as illustrated in FIG. 20, on the end surface corresponding to an inner surface 67d of both walls 67a of the narrow fishing line guide section 67 and facing the spool side, a line hooking surface 77 is formed of a recess 76 recessed in a curve on the fishing line unwinding side with respect to a vertical surface P extending in the up-down direction and passing the rear edge 68a" on the spool side.

The above-described line hooking surface 77 is configured to prevent the fishing line S from moving to the fishing line unwinding section 68 along the inclined guide surface 68a because of the line hooking surface 77 having a curved recess even when a relation between the fishing line guide body and a position of unwinding the fishing line in the spool becomes as illustrated in FIGS. 17 and 18.

Thus, since the line hooking surface 77 is formed of the recess 76 recessed in the curve, contact resistance applied to the fishing line is reduced and damage to the fishing line can be reduced even in the case where a high load is applied to the fishing line.

The embodiments according to the present invention have been described above, but the present invention is not limited to the above-described embodiments and various modifications may be made.

Figure 21A:
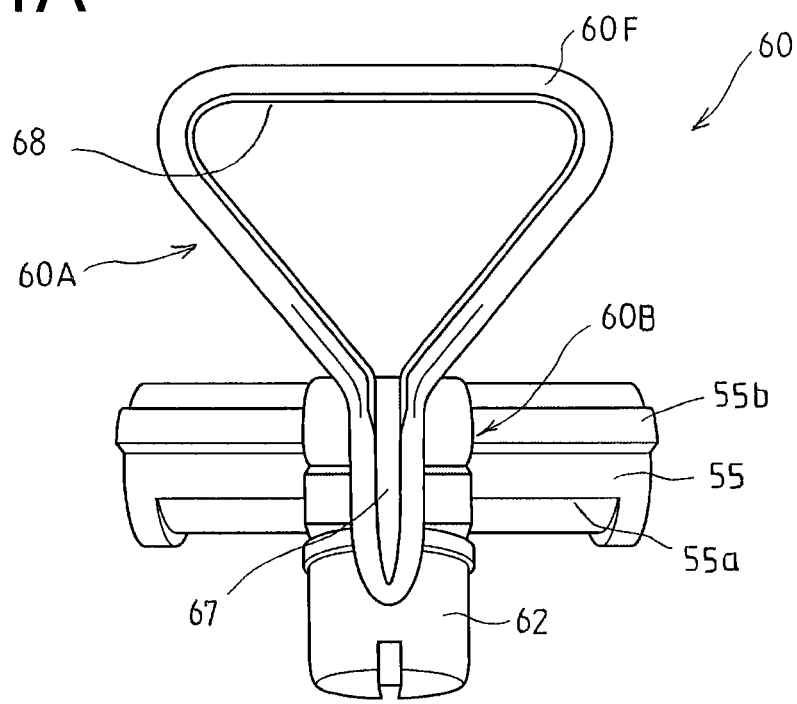
FIG. 21A is a front view illustrating a first modified example of the fishing line guide body.
Figure 21B:
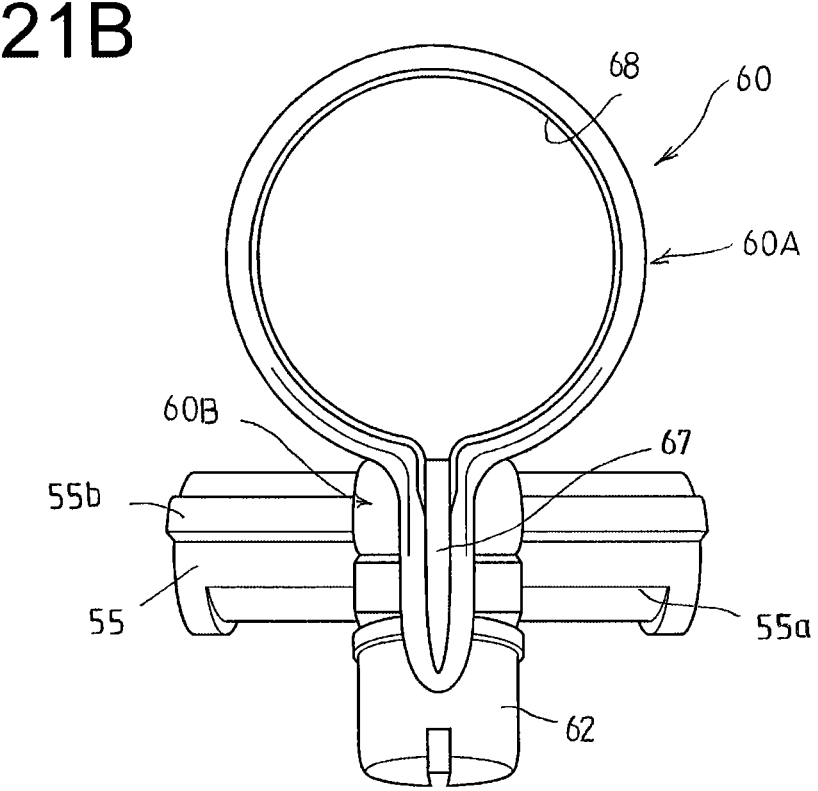
FIG. 21B is a front view illustrating a second modified example of the fishing line guide body.

The shape of the above-described fishing line guide body 60 may be suitably deformed. For example, the fishing line unwinding section 68 may be suitably deformed in a substantially triangular shape as illustrated in FIG. 21A or a substantially circular shape as illustrated in FIG. 21B. Also, like the first embodiment, in the case where the fishing line guide body 60 is rotated in the front and rear direction, the regulator 69 formed on the fishing line guide body 60 is not necessarily formed on the rear end edge of the flat-shaped upper wall 68b because a distance from the rotary axis (center of screw shaft 51) or a downward shifting distance of the fishing line may be adjusted according to a rotation angle of the tubular body 55. In other words, the shape of the regulator may be suitably deformed; for example, any part of the frame body 60F constituting the fishing line threading section 60A may be formed bent.

Additionally, any portion of the fishing line guide body 60, which contacts the fishing line, may be attached with a member (fishing line contacting member) having wear resistance as well as small resistance against sliding. By thus attaching the fishing line contacting member, it is possible to prevent the fishing line from being cut and reduce the contact resistance even in the case of contacting the fishing line while winding or unwinding the fishing line.

Further, although the fishing line guide body 60 is configured to rotate in conjunction with the clutch mechanism 20 according to the first embodiment, the fishing line guide body 60 does not necessarily work with the clutch mechanism, and may be configured, for example, to move vertically instead of rotating. Also, when the fishing line guide body 60 is rotated, the projection extending in the axial direction is provided on the outer periphery of the tubular body 55 to stop the rotation, but the rotation may be also stopped by the edge 55e of the long hole 55a formed on the tubular body 55. Further, the thumb rest 1D provided between the right and left side plates of the above-described reel body may be omitted or may configured openable/closable so as to reduce the resistance at the time of unwinding the fishing line.

Also, according to the second embodiment, the shaft 80 pressing the fishing line is configured to move vertically with respect to the reel body, but the shaft may be configured to move vertically, being supported by a palming plate which is opened/closed on the upper surface of the reel body. Additionally, the shape or arranged position of the line slippage preventing regulators 70 and 75 formed on the fishing line guide body 60 may be suitably deformed. For example, it may be formed of a projection so as to hook the fishing line, or may be arranged at the inner surface 67d of the both walls 67a of the fishing line guide section 67.

Moreover, the fishing line guide body 60 may be formed by integrating the fishing line threading section 60A and the holding portion 60B which are formed in two separate individual portions.

REFERENCE SIGNS LIST

1 Reel body
1A,1B Right and left side plates
5 Spool shaft
5A Spool
20 Clutch mechanism
50 Level wind device
55 Tubular body
60 Fishing line guide body
67 Fishing line guide section
68 Fishing line unwinding section
69 Regulator
70,75 Line slippage preventing regulator

The invention claimed is:

1. A fishing reel comprising:
a spool rotatably supported between right and left side plates of a reel body; and
a level wind device including a fishing line guide body configured to thread a fishing line unreeled from the spool and reciprocate between the right and left side plates,
wherein the fishing line guide body is supported in front of the spool and switchable between a fishing line winding state and a fishing line unwinding state, and further includes a fishing line guide section configured to guide the fishing line to the spool in the fishing line winding state and including a narrow width in a right and left direction, a fishing line unwinding section configured to reduce resistance against unwinding the fishing line in the fishing line unwinding state and including a wide width in the right and left direction, and a regulator configured to contact the fishing line to prevent the fishing line from slipping out of the fishing line guide section to the fishing line unwinding section in the fishing line winding state.

2. The fishing reel according to claim 1, wherein
the fishing line guide body is rotatably supported between the right and left side plates to be switched between the fishing line winding state and the fishing line unwinding state in conjunction with an ON/OFF state of a clutch mechanism, and
when the clutch mechanism is turned ON, the regulator is rotated so as to be be contactable with the fishing line, and guides the fishing line to the fishing line guide section.

3. The fishing reel according to claim 2, wherein
the level wind device includes a tubular body configured to hold the fishing line guide body slidable in the right and left direction and rotatably support the fishing line guide body in a front and rear direction, and
a rotation stopper is integrally formed with the tubular body along an axial direction so as to stop the fishing line guide body from rotating when the fishing line guide body slides in the right and left direction.

4. The fishing reel according to claim 3, wherein a wall portion constituting the fishing line guide section extends so as to cover a cap nut which holds a slidable member to be engaged with a screw shaft housed inside the tubular body.

5. The fishing reel according to claim 1, wherein the fishing line guide section is disposed in a center of a lower end portion of the width wide fishing line unwinding section, and
an inclined guide surface which is inclined toward the fishing line guide section and configured to guide the fishing line is formed on the fishing line unwinding section.

6. The fishing reel according to claim 1, wherein the regulator is rotated to contact the fishing line in the fishing line winding state.

7. A fishing reel comprising:
a spool rotatably supported between right and left side plates of a reel body; and
a level wind device including a fishing line guide body configured to thread a fishing line unreeled from the spool and reciprocate between the right and left side plates,
wherein the fishing line guide body includes a fishing line guide section configured to guide the fishing line to the spool in a fishing line winding state and including a narrow width in a right and left direction, a fishing line unwinding section configured to reduce resistance against unwinding the fishing line in a fishing line unwinding state and including a wide width in the right and left direction, and a line slippage preventing regulator defined by a step in the fishing line guide section and configured to regulate the fishing line not to slip out from the narrow width fishing line guide section to the wide width fishing line unwinding section when the fishing line is unreeled.

8. The fishing reel according to claim 7, wherein the line slippage preventing regulator is formed on an end surface facing a spool side of the fishing line guide body.

9. The fishing reel according to claim 8, wherein the line slippage preventing regulator is formed of an inclined surface.

10. The fishing reel according to claim 7, wherein
the fishing line guide body includes a regulator which prevents the fishing line from slipping out of the fishing line guide section in the fishing line winding state,
the fishing line guide body is rotatably supported between the right and left side plates to be switched between the fishing line winding state and the fishing line unwinding state in conjunction with an ON/OFF state of a clutch mechanism, and
when the clutch mechanism is turned ON, the regulator is rotated so as to contact the fishing line and guides the fishing line to the fishing line guide section.

11. The fishing reel according to claim 7, wherein the fishing line guide section is disposed in a center of a lower end portion of the wide width fishing line unwinding section, and
an inclined guide surface is formed at the fishing line unwinding section and the inclined guide surface is inclined toward the fishing line guide section and configured to guide the fishing line.

12. A fishing reel comprising:
a spool rotatably supported between right and left side plates of a reel body; and
a level wind device including a fishing line guide body configured to thread a fishing line unreeled from the spool and reciprocate between the right and left side plates,
wherein the fishing line guide body includes a fishing line guide section configured to guide the fishing line to the spool in a fishing line winding state and including a narrow width in a right and left direction, a fishing line unwinding section configured to reduce resistance against unwinding the fishing line in a fishing line unwinding state and including a wide width in the right and left direction, and a line slippage preventing regulator defined by a recess in the fishing line guide section and configured to regulate the fishing line not to slip out from the narrow width fishing line guide section to the wide width fishing line unwinding section when the fishing line is unreeled.

\* \* \* \* \*